United States Patent
Barkas et al.

(10) Patent No.: US 11,416,927 B1
(45) Date of Patent: Aug. 16, 2022

(54) SYSTEMS AND METHODS FOR PRIVATE LOAN CREATION

(71) Applicant: Wells Fargo Bank, N.A., San Francisco, CA (US)

(72) Inventors: Sotirios K. Barkas, San Jose, CA (US); Yon W. Lee, San Francisco, CA (US); Darius A. Miranda, San Francisco, CA (US); Marria Rhodriquez, San Francisco, CA (US); Darrell L. Suen, San Ramon, CA (US); John T. Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/157,525

(22) Filed: Jan. 25, 2021

Related U.S. Application Data

(63) Continuation of application No. 15/949,283, filed on Apr. 10, 2018, now Pat. No. 10,902,514.

(51) Int. Cl.
  *G06Q 40/00* (2012.01)
  *G06Q 40/02* (2012.01)
(52) U.S. Cl.
  CPC .................................. *G06Q 40/025* (2013.01)
(58) Field of Classification Search
  None
  See application file for complete search history.

(56) References Cited

U.S. PATENT DOCUMENTS

| | | | |
|---|---|---|---|
| 6,223,983 B1* | 5/2001 | Kjonaas | G07F 19/20 705/42 |
| 7,343,335 B1 | 3/2008 | Olliphant | |
| 8,001,035 B2 | 8/2011 | Kwan | |
| 8,280,788 B2* | 10/2012 | Perlman | G06Q 20/405 705/40 |
| 8,447,692 B2 | 5/2013 | Thomas et al. | |
| 10,094,655 B2* | 10/2018 | Sabitov | G01B 11/14 |
| 2004/0186738 A1* | 9/2004 | Reisman | G06Q 30/0601 705/26.1 |
| 2005/0027626 A1 | 2/2005 | Garcia | |

(Continued)

OTHER PUBLICATIONS

AI Research Funding Portfolios and Extreme Growth (Year: 2020).*

(Continued)

*Primary Examiner* — Bruce I Ebersman
(74) *Attorney, Agent, or Firm* — Foley & Lardner LLP

(57) ABSTRACT

Examples described herein relate to media, apparatuses and methods. In an embodiment, a digital funding group for transactions initiated by a user via a user computing device is established. Information relating to a prospective transaction is received via a client application. The client application monitors a system idle timer of the user computing device and resets the system idle timer at predetermined time intervals, thereby maintaining the user computing device in active mode. The client application performs an electronic search for a sponsorship opportunity related to the at least one prospective transaction, generates a displayable result set comprising at least one prospective sponsor; renders the displayable result set, and responsive to a user selection of a particular sponsor from the displayable result set, causes the particular sponsor to be added to the digital funding group.

20 Claims, 6 Drawing Sheets

(56) References Cited

U.S. PATENT DOCUMENTS

| | | | |
|---|---|---|---|
| 2006/0259957 A1 | 11/2006 | Tam et al. | |
| 2007/0061393 A1* | 3/2007 | Moore | G16H 10/60 |
| | | | 709/201 |
| 2007/0106754 A1* | 5/2007 | Moore | G16H 10/60 |
| | | | 707/E17.116 |
| 2007/0168461 A1* | 7/2007 | Moore | H04L 67/02 |
| | | | 709/217 |
| 2008/0040151 A1* | 2/2008 | Moore | G16H 40/67 |
| | | | 705/2 |
| 2008/0201246 A1 | 8/2008 | Casey et al. | |
| 2009/0271257 A1 | 10/2009 | Flake et al. | |
| 2010/0121745 A1 | 5/2010 | Teckchandani et al. | |
| 2011/0060639 A1 | 3/2011 | Garcia | |
| 2011/0251861 A1 | 10/2011 | Cundle | |
| 2011/0270661 A1 | 11/2011 | Heiser et al. | |
| 2012/0109804 A1 | 5/2012 | Gandhi et al. | |
| 2012/0239593 A1 | 9/2012 | Von Der Borch | |
| 2013/0013516 A1 | 1/2013 | Hamilton | |
| 2013/0073374 A1* | 3/2013 | Heath | G06Q 30/02 |
| | | | 705/14.39 |
| 2013/0073473 A1* | 3/2013 | Heath | G06Q 30/0241 |
| | | | 705/319 |
| 2013/0262294 A1 | 10/2013 | Green et al. | |
| 2013/0291060 A1* | 10/2013 | Moore | H04L 67/02 |
| | | | 726/1 |
| 2013/0304522 A1* | 11/2013 | Cundle | G06Q 50/14 |
| | | | 705/5 |
| 2013/0346164 A1 | 12/2013 | Ramamurti | |
| 2014/0279435 A1* | 9/2014 | Holman | G06Q 20/405 |
| | | | 705/39 |
| 2015/0363762 A1* | 12/2015 | Kimberg | G06Q 20/202 |
| | | | 705/40 |
| 2016/0004820 A1* | 1/2016 | Moore | H04W 4/21 |
| | | | 705/3 |
| 2016/0042328 A1 | 2/2016 | Teckchandani et al. | |
| 2017/0169508 A1* | 6/2017 | Song | G06Q 20/223 |
| 2017/0243177 A1* | 8/2017 | Johnsrud | G06Q 20/401 |
| 2017/0243209 A1* | 8/2017 | Johnsrud | H04M 15/854 |
| 2017/0243212 A1* | 8/2017 | Castinado | G06Q 20/389 |
| 2017/0243213 A1* | 8/2017 | Castinado | H04L 9/3236 |
| 2017/0243214 A1* | 8/2017 | Johnsrud | G06Q 40/025 |
| 2017/0243222 A1* | 8/2017 | Balasubramanian | |
| | | | G06Q 20/4014 |
| 2017/0243286 A1* | 8/2017 | Castinado | H04L 9/3239 |
| 2017/0243287 A1* | 8/2017 | Johnsrud | G06Q 40/025 |
| 2017/0244707 A1* | 8/2017 | Johnsrud | H04L 9/3247 |
| 2018/0165655 A1* | 6/2018 | Marcelle | G06K 7/1417 |
| 2019/0102835 A1 | 4/2019 | Bjonerud et al. | |

OTHER PUBLICATIONS

FinTech: A New Hedge for a Financial Re-intermediation. Strategy and Risk Perspectives (Year: 2021).*

Sanicola, Laura, "How to take group vacations (without losing friends)", http://money.cnn.com/2017/09/08/pf/vacation-with-friends/index.html, Sep. 8, 2017. 4 pages.

Shigetomi R., Otsuka A., Ogawa T., Imai H. (2002) An Anonymous Loan System Based on Group Signature Scheme. In: Chan A.H., Gligor V. (eds) Information Security. ISC 2002. Lecture Notes in Computer Science, vol. 2433. pp. 244-256.

* cited by examiner

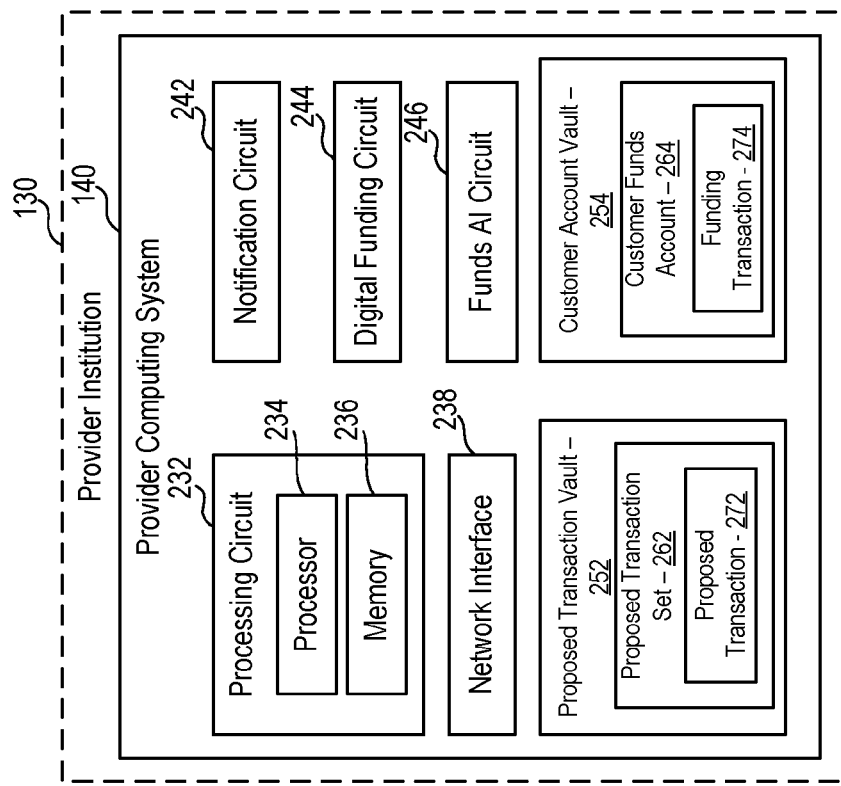
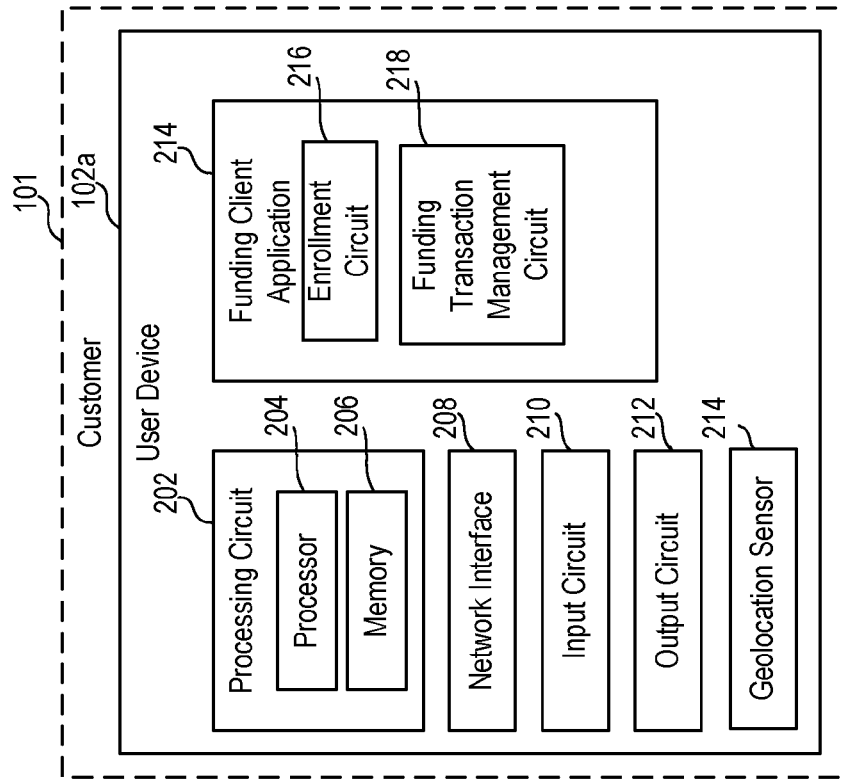
Fig. 2A
Fig. 2B

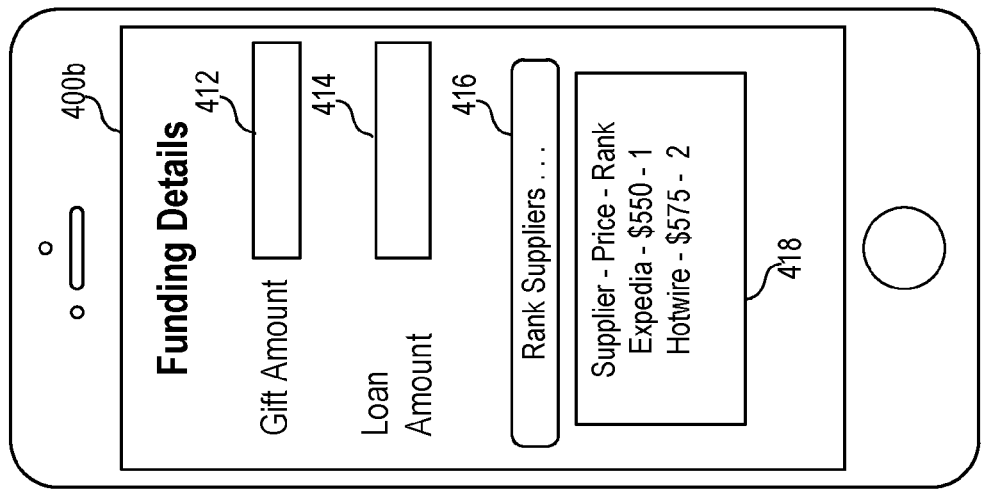
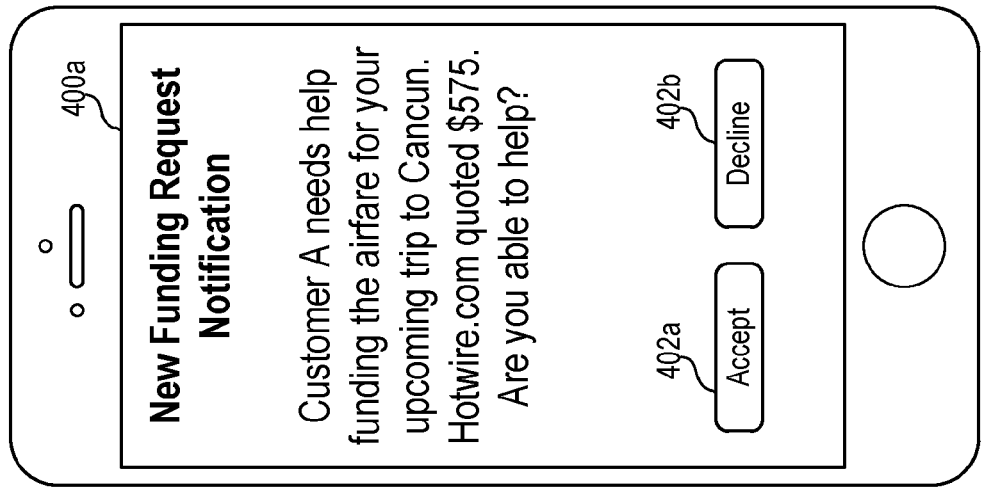
Fig. 4B
Fig. 4A

SYSTEMS AND METHODS FOR PRIVATE LOAN CREATION

CROSS-REFERENCE TO RELATED PATENT APPLICATIONS

This application is a Continuation of U.S. application Ser. No. 15/949,283, filed Apr. 10, 2018, incorporated herein by reference in its entirety.

BACKGROUND

Individuals may form lending groups to help one another afford various expenses. However, the lending arrangements formed through such groups are labor-intensive, time consuming to negotiate in-person, and difficult to track. Ad-hoc lending groups are difficult to form for a specific purpose (e.g., a vacation, going to an event, etc.), especially on short notice. Many ad-hoc groups are formed off-line, and service providers, vendors, etc. are unable to become aware of and capitalize on opportunities to offer targeted assistance, such as a platform for servicing an ad-hoc transaction or a service or product needed by the ad-hoc group.

SUMMARY

In one arrangement, a method for method for facilitating automatic anonymous group funding includes establishing, by a provider computing system, a digital funding group, the digital funding group comprising a plurality of user devices, each user device is operated by a customer from a plurality of customers of a provider institution, and each of the plurality of user devices is configured to anonymize the customer by obscuring identity of the customer to other customers from the plurality of customers, obtaining, by the provider computing system, a set of proposed transactions, the set of proposed transactions comprising at least one proposed transaction for the digital funding group, determining, by the provider computing system, that a first user device from the plurality of user devices is associated with a first customer unable to afford the at least one proposed transaction, receiving, by the provider computing system, from a second user device associated with a second customer from the plurality of customers, the second customer being different from the first customer, an indication of agreement to provide assistance to the first customer, wherein the indication is provided in response to a notification about the first customer's inability to afford the at least one proposed transaction, the notification generated by the provider computing system and provided to each of the plurality of user devices, authorizing, by the provider computing system, an assistance transaction based at least on the indication of acceptance, the assistance transaction comprising transaction terms and a transaction amount.

In one arrangement, a computing system configured to provide automated anonymous loan creation services includes a processing circuit having a processor and a memory, wherein the processing circuit implements an Artificial Intelligence (AI) circuit configured to establish the digital funding group comprising a plurality of user devices, each user device is operated by a customer from a plurality of customers of a provider institution, and wherein each of the plurality of user devices is configured to anonymize the customer by obscuring identity of the customer to other customers from the plurality of customers, obtain a set of proposed transactions, the set of proposed transactions comprising at least one proposed transaction for the digital funding group, determine that a first user device from the plurality of user devices is associated with a first customer unable to afford the at least one proposed transaction, receive from a second user device associated with a second customer from the plurality of customers, the second customer being different from the first customer, an indication of agreement to provide assistance to the first customer, the indication is provided in response to a notification about the first customer's inability to afford the at least one proposed transaction, the notification generated by the provider computing system and provided to each of the plurality of user devices, authorize an assistance transaction based at least on the indication of acceptance, the assistance transaction comprising transaction terms and a transaction amount.

In one arrangement, a non-transitory computer-readable medium having processor-readable instructions stored thereon that, when executed by a processor, cause the processor to provide anonymous loan creation services for a customer of a provider by establishing a digital funding group, the digital funding group comprising a plurality of user devices, wherein each user device is operated by a customer from a plurality of customers of a provider institution, and wherein each of the plurality of user devices is configured to anonymize the customer by obscuring identity of the customer to other customers from the plurality of customers, obtaining a set of proposed transactions, the set of proposed transactions comprising at least one proposed transaction for the digital funding group, determining that a first user device from the plurality of user devices is associated with a first customer unable to afford the at least one proposed transaction, receiving from a second user device associated with a second customer from the plurality of customers, the second customer being different from the first customer, an indication of agreement to provide assistance to the first customer, wherein the indication is provided in response to a notification about the first customer's inability to afford the at least one proposed transaction, the notification generated by the provider computing system and provided to each of the plurality of user devices, authorizing an assistance transaction based at least on the indication of acceptance, the assistance transaction comprising transaction terms and a transaction amount.

These and other features, together with the organization and manner of operation thereof, will become apparent from the following detailed description when taken in conjunction with the accompanying drawings.

BRIEF DESCRIPTION OF THE FIGURES

FIG. 2A is a diagram of a user device of the system shown in FIG. 1 according to some arrangements.

FIG. 2B is a diagram of a provider computing system shown in FIG. 1 according to some arrangements.

FIG. 4A-4B are interface display diagrams illustrating interactive user interfaces for managing a new funding request according to some arrangements.

DETAILED DESCRIPTION

Figure 1:
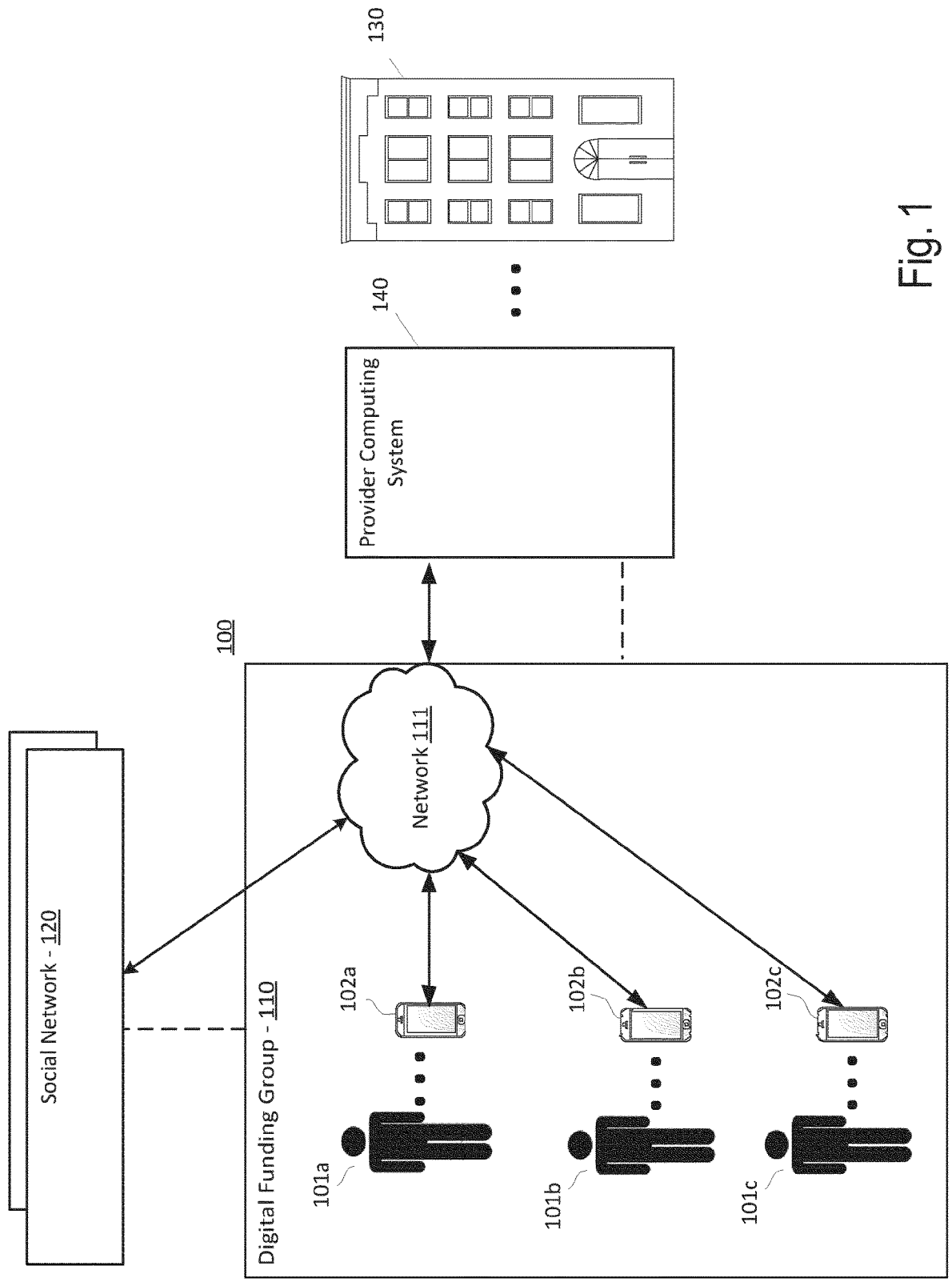
FIG. 1 is a diagram of a system for facilitating automatic anonymous group funding according to some arrangements.

Arrangements described herein relate to systems, apparatuses, and methods for implementing automatic digital anonymous group funding. A "funding transaction" (also known as "financial aid transaction", "assistance", and/or "assistance transaction") is defined as a gift, discount, loan, reward, etc. given by one member of a digital funding group to another member.

Various arrangements described herein enable a customer to opt into a service through which the customer may receive relief from her peers in the event that the customer is unable to afford an electronic or digital transaction. The system includes a platform through which people can set up digital funding groups for certain events. For example, friends going on a trip may set up a digital funding group for the trip, listing all of the attendees of the trip and various expenses (e.g., airfare, lodging) for the trip. The expenses may be incurred via electronic or digital transactions. Once the expenses are set up or otherwise determined, members of the group may indicate whether they have enough funds set aside to afford the various expenses to be incurred via electronic or digital transactions. Such determination may be made automatically based on user financial information stored in a provider computing system. If it is determined that a member of the group is unable to afford the expenses, the other members of the group are notified and provided the opportunity to assist the customer. If the customer (e.g., the recipient of financial assistance) indicates such a preference, a certain subset of the customer's financial information may be displayed on the notifications (e.g., account balance, credit, etc.). In some arrangements, the notifications also enable members of the group to pay for the distressed member's trip (e.g., via a P2P loan or the like).

As will be appreciated, a provider computing system is configured to establish a digital funding group, obtain a set of proposed digital transactions for at least one member of the digital funding group, and determine that a first user device from the plurality of user devices associated with the digital funding group is associated with a first customer unable to afford at least one proposed transaction. The provider computing system broadcasts a notification to the digital funding group requesting funds, matches funds provider(s) to the funds recipient, generates a funding transaction, provides the terms to the sender(s) and recipient of funds, modifies the terms as needed, and initiates a funds transfer. In some arrangements, the funds transfer may be automatic. In some arrangements, a funds artificial intelligence (AI) circuit of the provider computing system is configured to browse the internet and/or mine affiliate/preferred vendor data to identify cost-effective alternatives to the proposed transaction and/or sponsorship opportunities for affiliates/preferred vendors.

Advantageously, the arrangements described herein implement automatic, anonymous digital funding groups. Herein, "automatic" is defined as pertaining to an electronically carried out action that does not require outside (either human or machine) intervention to be scheduled, triggered, executed, and/or completed. "Anonymous" (e.g., "private", "anonymized") is defined as access-controlled or secured (with respect to digitized information about the members of a funding group and/or about their electronic devices) such that (a) the identities of the members are not revealed to anyone outside the group; and/or (b) the parties requesting funding, providing funding, or both can remain anonymous to everyone else, including the counterparties to funding/financial aid transactions. Traditional, non-digitized loan creation processes cannot provide such automation and anonymity.

Advantageously, the arrangements described herein improve computer-related technology by automating certain steps that cannot be performed by human actors in lending groups without significant effort and time spent. For example, the funds artificial intelligence (AI) circuit is structured to analyze historical financial transactions to identify spending pattern(s) of the customer and use the spending pattern(s) to predict, in an accurate, realistic and timely manner, a need for financial aid. In some arrangements, the funds AI circuit 246 is structured to evaluate the financial position of the customer (such as spending history, account balance, credit score, and the like) to determine risk information for the customer. In some arrangements, the funds AI circuit is structured to comprise a bot that crawls the internet and/or affiliate data sources to find alternative suppliers, rates, terms, etc. for the proposed funding transaction. In some arrangements, the funds AI circuit is structured to obtain the location of the customer (recipient of funds) through the geolocation sensor of the mobile device to identify local suppliers likely to service the transaction and/or likely to provide financial aid in the form of discounts. The information is presented to the customer through a user interface of a mobile user device, such as a smartphone.

Advantageously, the loan creation process as described herein displays a limited set of information to a user, by displaying selected, relevant information onto one interface to minimize scrolling. The provided relevant information is relevant in the context of anonymous loan creation, making this process very simple and expedited. The user does not need to browse the internet (and thus click on multiple links, input the details of the proposed transaction into search boxes, browse different websites, etc.) to search for options because the provider computing system may present already vetted options through an aggregated list, which is a limited set of relevant options presented to through a streamlined interface, by browsing the internet or a pre-defined list of preferred vendors for the digital funding group. Thus, advantageously, the arrangement saves the users time and effort, the speed of navigation is improved and only a few steps are needed from receiving a notification to completing a digitized, automatic financial aid transaction. Further, in some embodiments, the speed of navigation is further improved because the notification is a "light" notification such that the user does not need to log in to use the functionality of the system. Additionally, and advantageously, by using a pre-defined list of preferred vendors for the digital funding group presented to the user through the user interface of the mobile user device, the organizer/owner of the digital funding group and its affiliates benefit from cross-selling opportunities by presenting the relevant options to their customers.

FIG. 1 is a diagram of a system 100 for facilitating automatic anonymous group funding according to some arrangements. In brief overview, system 100 includes one or more individual user device(s) 102n (such as 102a, 102b, and 102c as shown) used by one or more customer(s) 101n (such as 101a, 101b, and 101c as shown) to interact with the provider computing system 140 and/or the social network 120.

The individual computing device(s) 102n, according to various arrangements, may comprise smartphones, laptop computers, tablet computers, e-readers, wearable devices (such as a smart watch, a smart bracelet, and the like), and other suitable device(s). A customer 101n is a customer or potential customer of a provider institution 130. The plurality of user devices 102n of customer(s) 101n comprise the digital funding group 110. The digital funding group 110 is a membership-only, private entity that is managed electronically by the provider computing system 140 as described further herein.

The customer 101n can be any entity (e.g., an individual, a company, or the like). In some examples, the provider institution 130 is a financial institution. In some arrangements, the customer 101n is a customer or potential customer of one or more other provider institutions (not shown).

All or some customer(s) 101n may have funds accounts with the provider institution 130. The provider institution 130 includes one or more of a bank branch, loan office, mortgage office, services office, retail office, automated teller machine (ATM) location, a combination thereof, and/or the like. The provider institution 130 manages and/or operates the provider computing system 140. In some examples, the provider institution computing system 140 is a financial institution computing system. The provider institution 130 provides products and services such as, but not limited to, credit card accounts, mobile wallet, checking/saving accounts, retirement accounts, mortgage accounts, loan accounts, investment and accounts, and the like to the customer(s) 101n via the provider computing system 140. While the provider institution 130 is depicted as a brick and mortar location in FIG. 1, one of ordinary skill in the art can appreciate that one or more of the provider institutions 130 may not be associated with brick and mortar locations.

The individual computing device(s) 102n and the provider computing system 140 are connected to the network 111. The network 111 is any suitable Local Area Network (LAN) or Wide Area Network (WAN). For example, the network 111 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combinations thereof, and/or the like. The network 111 is structured to permit the exchange of data, values, instructions, messages, and the like among the user device(s) 102n and the provider institution 130.

In some arrangements, also connected to the network 111 is a social networking platform (social network) 120. In some arrangements, the social networking platform 120 is an electronic social networking site, social media, or another suitable environment that allows a plurality of individuals to build social network(s) based on, for example, activities, backgrounds, shared interests, geographic proximity, real-life personal and/or business connections, and/or other factors. The users of the social networking platform may include customer 101n. In an example arrangement, customer 101a may be connected to customer 101b via the social network(s) 120. In some arrangements, the data from a data vault associated with the social network(s) 120 is accessed and/or received by the provider computing system 140 to identify, create, modify, and manage the digital funding group 110, as described further herein.

FIGS. 2A-2B show the user device 102n and the provider computing system 140 of an example arrangement.

According to various arrangements, the provider computing system 140 and/or each of the plurality of user device(s) 102n may include at least one electronic circuit and at least one data storage entity. One or more electronic circuit(s) may be implemented as software code suitable for compilation, object code, executable file(s) and/or code, a set of machine language instructions, and/or in another suitable form for carrying out the computer-implemented method(s) described herein. In some arrangements, the one or more electronic circuit(s) may be implemented in a distributed fashion such that at least some of the code is executed and/or compiled on the individual computing device(s) 102n. One or more data storage entities of the provider computing system 140 may be implemented as an electronic structure (s) suitable for storing information, including, for example, one or more persistent electronic structures, such as one or more database(s), electronic file(s), data mart(s), distributed ledger(s) and the like. The data stored in the one or more data storage entities of the provider computing system 140 may be stored in a multidimensional form such that the structure of the data storage entity has two dimensions (e.g., a look-up table having indexed data) or more (e.g., a relational database, a multi-dimensional database, an online analytical processing (OLAP) cube, etc.).

FIG. 2A is a diagram of a user device 102n of the system shown in FIG. 1 according to some arrangements. The user device 102n comprises a processing circuit 202, a network interface 208, an input circuit 210, an output circuit 212, a geolocation sensor 214, and a funding client application 234, which may comprise an enrollment circuit 226 and a funding transaction management circuit 228.

The processing circuit 202 is composed of a processor 204 and a memory device 206. The processor 204 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 206 can be implemented with a Random Access Memory (RAM), Read-Only Memory (ROM), Non-volatile RAM (NVRAM), Flash Memory, hard disk storage, cloud storage, and other suitable electronic storage devices. The memory 206 stores data and/or computer code for facilitating at least some of the various processes described herein. The memory 206 includes tangible, non-transient volatile memory, or non-volatile memory. The memory 206 stores programming logic that, when executed by the processor 204, controls the operations of the user device 102n. In some arrangements, the user device 102n and the memory 206 form various processing circuits of the user device 102n.

In some embodiments, the funding client application 234 is a multithreaded application configured to prioritize processing tasks and perform certain tasks (e.g., long-running processes, such as web queries, saving data, downloading data, coordination of funding opportunities, coordination of digital contracts, etc.) in background mode. For example, in some embodiments, such as those discussed with respect to FIGS. 5A and 5B, the funding client application 234 is configured to crawl the web to collect data from potential financial assistance providers (e.g., sponsors) and/or to automatically rank of various options. In some embodiments, these processes are configured to be executed in the background so that a new notification, when it arrives, is immediately displayed to the user (for example, as a pop-up notification) without waiting for the previous task to complete. In some embodiments, the funding client application 234 is configured to automatically maintain the user device 102n in active mode and/or to periodically wake up the user device 102n such that the user device 102n remains active until the until the long-running process is completed. Advantageously, interruption or timing out of the long-running process is avoided. In an example embodiment, to maintain the user device 102n is active mode, one or more circuits of the funding client application 234 is/are configured to monitor a system idle timer and reset it at predefined intervals (e.g., every 1 sec., every 5 sec., every 15 sec., every 30 sec.) to prevent the user device 102n from going into sleep mode and/or powering off.

As shown, the user device 102n includes a network interface 208. The network interface 208 is structured for sending and receiving data over the network 111. Accordingly, the network interface 208 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The input circuit 210 is configured to receive user input the customer 101n. The output circuit 212 is configured to output information in the form of graphics, sound, tactile feedback (e.g., vibrations), and the like. In this regard, the input circuit 210 and the output circuit 212 are structured to exchange data, communications, instructions, etc. with an input/output component of the user device 102n. Accordingly, in some arrangements, the input circuit 210 and the output circuit 212 can be combined into an input/output circuit that includes or is coupled to an input/output device such as but not limited to, a display device, touchscreen, keyboard, microphone, and/or the like. In some arrangements, the input/output circuit includes communication circuitry for facilitating the exchange of data, values, messages, and the like between the input/output device and the components of the user device 102n. In some arrangements, the input circuit 210 and the output circuit 212 include machine-readable media for facilitating the exchange of information between the input/output device and the components of the user device 102n. In still another arrangement, the input circuit 210 and the output circuit 212 include any combination of hardware components (e.g., a touchscreen), communication circuitry, and machine-readable media.

The geolocation sensor 214 is structured to determine and provide current positional information, such as coordinates, of the device 102n. The geolocation sensor 214 comprises a receiver chip, which is an electronic circuit that may contain instructions thereon for issuing and receiving communication signals through the network 111. The receiver chip may be configured to receive global positioning system (GPS) signals, cellular tower signals, satellite network signals, etc. to determine the coordinates of the device 102n.

The funding client application 224 is associated with and/or connected to the provider computing system 140 and installed on, or otherwise provided to (for example, using the software-as-a-service delivery model), the individual computing device(s) 102n. The enrollment circuit 226 of the funding client application 224 is structured to allow the customer 101n to join the digital funding group 110, interact with other members of the digital funding group 110, etc. The funding transaction management circuit 228 is structured to allow the customer 101n to receive new funding request notifications, review and update funding details, submit funding requests, receive sponsorship opportunity notifications, review and update sponsorship details, rank preferred suppliers for proposed funding transactions, receive and accept proposed funding notifications, and update funding details.

In some arrangements, the funding client application 224 may comprise, be part of, and/or be configured to interact with (for example, through an application programming interface (API)) with one or more circuits of the provider computing system 140, which are described further herein.

FIG. 2B is a diagram of a provider computing system 140 shown in FIG. 1 according to some arrangements. Electronic circuits of the provider computing system 140 include the processing circuit 232, the network interface 238, the notification circuit 242, the digital funding circuit 244, and the funds artificial intelligence (AI) circuit 246. The data storage entities of the provider computing system 140 include the proposed transaction vault 252 and the customer account vault 254. These circuits and/or data storage entities may be combined as needed such that one or more data storage entities and/or circuit(s) are implemented in a hybrid form. An example of a hybrid implementation is a data storage entity having a shell and/or providing an API such that a library of code (for example, executable functions containing Data Manipulation Language (DML) instructions) may be used by entities within or outside the system 100. In some arrangements, some API functions are deployed to, compiled, and/or executed on or by the user device 102n.

The processing circuit 232 is composed of a processor 234 and a memory device 236. The processor 234 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 236 can be implemented with a Random Access Memory (RAM), Read-Only Memory (ROM), Non-volatile RAM (NVRAM), Flash Memory, hard disk storage, cloud storage, and other suitable electronic storage devices. The memory 236 stores data and/or computer code for facilitating at least some of the various processes described herein. The memory 236 includes tangible, non-transient volatile memory, or non-volatile memory. The memory 236 stores programming logic that, when executed by the processor 234, controls the operations of the provider computing system 140. In some arrangements, the memory 206 is part of various processing circuits of the provider computing system 140.

As shown, the provider computing system 140 includes a network interface 238. The network interface 238 is structured for sending and receiving data over the network 111. Accordingly, the network interface 238 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

According to various arrangements, the notification circuit 242 is structured to generate and issue notifications to members of the funding group 110, create an alias for the customer 101n who needs funding and include the alias in the notification, receive an indication of agreement to provide financial assistance from a second user device 102b of the second customer 101b, provide a message that includes a funding notification to the user device 102a of the customer 101a (recipient of funds), and/or present to the members of the digital funding group 110 an interface (such as a digital form) allowing the users to rank the various sponsor options.

According to various arrangements, the digital funding circuit 242 is structured to obtain, generate or predict a proposed transaction set 262 in the proposed transaction vault 252. The proposed transaction set 262 includes one or more proposed transactions, which represent a request for funding (financial aid) for a customer 101n who is a member of the digital funding group 110. In some arrangements, the digital funding circuit 244 is structured to identify a purchase contemplated by the customer 101a and to generate the at least one proposed transaction 272 representing this purchase. In some arrangements, the digital funding circuit 244 is structured to access the customer account vault 254 and retrieve one or more customer funds account(s) 264 associated with the customer 101a to obtain a data set on historical financial transactions used to determine a need for financial aid. In some arrangements, the digital funding circuit 244 uses information on parameters pre-defined by the second customer 101b for automatic approval of funding requests to which user 101b agrees if they meet certain thresholds, as described further herein. The digital funding circuit 244 generates a funding transaction 274. In some arrangements, the digital funding circuit 244 obtains or provides sponsor ranking information to fund the proposed transaction 272. The digital funding circuit 244 may be structured to notify the local business of the sponsorship opportunity. In some arrangements, the digital funding circuit 244 initiates an electronic funds transfer from a funds account of the customer 101b (the sender) to a funds account of the customer 101a (the recipient).

According to various arrangements, the funds AI circuit 246 is structured to capture, track, and/or otherwise access the internet browsing history, email history, telephone call history, SMS/text message history, and/or the geolocation history of the customer 101a to suggest a proposed funding transaction 272 to the customer 101a. In some arrangements, the funds AI circuit 246 is structured to analyze the historical financial transactions to identify spending pattern(s) of the customer 101a and use the spending pattern(s) to predict the at least one proposed transaction 272. In some arrangements, the funds AI circuit 246 is structured to evaluate the financial position of the customer 101n (such as spending history, account balance, credit score, and the like) to determine risk information for the customer 101n. In some arrangements, the funds AI circuit 246 is structured to comprise a bot that crawls the internet and/or queries data sources of the provider institution's affiliates connected to the provider computing system 140 through, for example, an API, to find alternative suppliers, rates, terms, etc. for the proposed transaction 272, add sponsors to the digital funding group 110, etc. In some arrangements, the funds AI circuit 246 is structured to obtains the location of the customer 101a (recipient of funds) through the geolocation sensor 214 of the mobile device 101a. Based on the geolocation information, the funds AI circuit 246 may be configured to identify local merchants or other service providers to sponsor the customer 101a.

Figure 3:
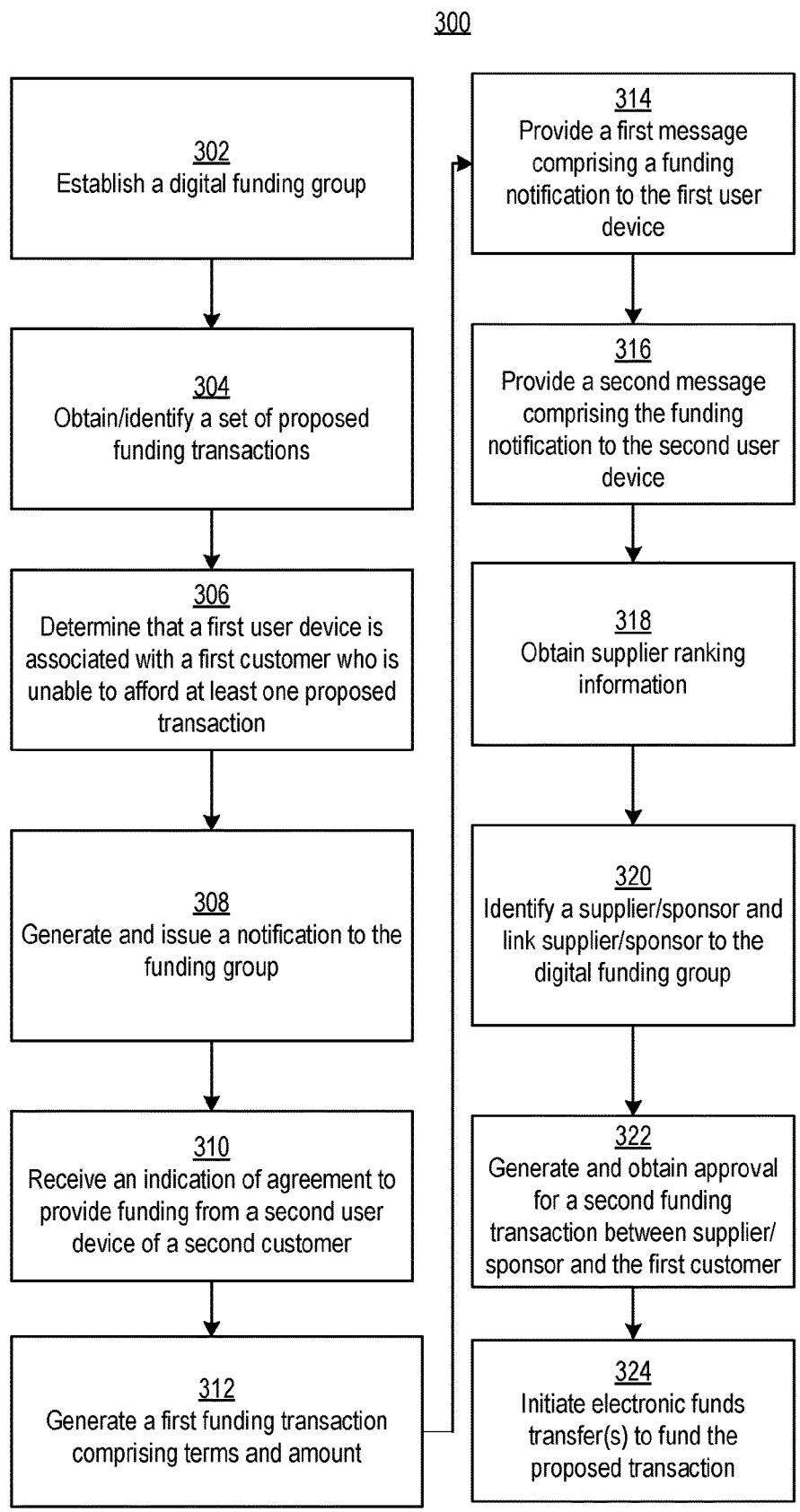
FIG. 3 is a flow diagram illustrating a method for facilitating automatic anonymous group funding according to some arrangements.

FIG. 3 is a flow diagram illustrating a method for facilitating automatic anonymous group funding according to some arrangements.

At 302, the digital funding circuit 244 of the provider computing system 140 associated with the provider institution 130 establishes a digital funding group 110. The digital funding group 110 comprises at least two customers 101n and a plurality of user devices 102n, such as user devices 102a, 102b, and 102c of FIG. 1. As shown in the example arrangement, each of the user devices 102a, 102b, and 102c is respectively associated with and operated by the customer 101a, 101b, and 101c. In some arrangements, each of the customers 101a, 101b, and 101c are customers of the provider institution 130. In some arrangements, some or all of the customers 101a, 101b, and 101c have a user account on one or more social network(s) 120.

At 304, the digital funding circuit 244 obtains, generates or predicts a proposed transaction set 262. The proposed transaction set 262 has at least one proposed transaction 272. Herein, a "proposed transaction" is defined as an assistance transaction between one or more customers 101n. For example, in an example arrangement, customer 101a may require funding to cover an expected purchase or expense. Customer 101b and/or customer 101c may provide the funding to customer 101a.

In some arrangements, the customer 101a supplies the information on the at least one proposed transaction 272 by, for example, using a user interface of the user device 102a to enter the information, including, for example, transaction description, transaction date, transaction amount, payee, etc. In some arrangements, the customer 101a uses the user interface of the user device 102a to indicate an interest in purchasing a product and/or a service, which may be provided by a third party. For example, provider computing system 140 and/or the user device 102a (for example, the browser software installed on or deployed to the user device 102a) may be configured to capture, track, and/or otherwise access the internet browsing history, email history, telephone call history, SMS/text message history, and/or the geolocation history of the customer 101a. This information may be used by the digital funding circuit 244 to identify a purchase contemplated by the customer 101a and to generate the at least one proposed transaction 272 representing this purchase. For instance, if the customer 101a visits a car dealership, this information may be captured by a geolocation sensor 214 of the mobile device 101a. If the customer 101a has also and/or alternatively browsed automotive websites to research a particular vehicle make and model, the digital funding circuit 244 may evaluate this information and conclude that the customer 101a is likely to purchase a car. The digital funding circuit 244 may generate a proposed transaction 272 for the car purchase. The proposed transaction 272 may be presented to the customer 101a for approval through the user interface of the user device 102a.

At 306, the digital funding circuit 244 determines that a first user device, such as user device 102a, is associated with a user, such as customer 101a who is unable to afford the proposed transaction 272. In some arrangements, the digital funding circuit 244 accesses the customer account vault 254 and retrieves one or more customer funds account(s) 264 associated with the customer 101a to obtain a data set on historical financial transactions, such as payments to a third party. The funds AI circuit 246 may analyze the historical financial transactions to identify spending pattern(s) of the customer 101a and use the spending pattern(s) to predict the at least one proposed transaction 272. In some arrangements, the digital funding circuit 244 identifies a recurring expense from the customer funds account 264, such as, for example, a rent payment, a car loan installment payment, a mortgage payment, etc. The digital funding circuit 244 analyzes the current and/or projected balance of the customer funds account 264 and may determine, based on this evaluation, that the customer 101a will not be able to cover the proposed transaction in its entirety. For example, the customer 101*a* may be faced with a payment due of $1,500 and may have only $1,000 in the customer funds account 264. The difference ($500) is the amount of a new proposed transaction 272 created by the provider computing system 140. In some arrangements, the expense is a joint expense of at least two customers 101*a* and 101*b*. The digital funding circuit 244 may be configured to access a first customer funds account 264 of the customer 101*a* and a second customer funds account 264 of the customer 101*b* to determine whether a combined balance of these accounts is sufficient to cover the joint expense, percentage allocation of the joint expense between the customer 101*a* and 101*b*, etc. Based on this information, the digital funding circuit 244 may be configured to calculate the amount of the proposed transaction 272, determine the recipient of the financial aid for the proposed transaction 272, such as customer 101*a* if customer 101*a* is not able to cover his or her share of the joint expense, determine the intended funding party, such as customer 101*b* if customer 101*a* is not able to cover the expense, etc. In some arrangements, the digital funding circuit 244 is structured to access a data source that includes budget information for the customer 101*a* (such as anticipated expense data, description, amount, payee, etc.) and determine whether the amount of the proposed transaction 272 exceeds the budget.

At 308, the notification circuit 242 generates and issues a notification to members of the funding group 110. The notification informs the members that a customer needs funding. The notification is broadcast or otherwise digitally transmitted to each of the user devices 102*n* as an email, SMS/text message, telephone call, a pop-up, a link to a web page opened through a web browser on each of the user devices 102*n*, etc. In some arrangements, the identity of the customer 101*n* that needs assistance is masked and/or the customer 101*n* needing assistance is anonymized. According to various arrangements, this can be accomplished by, for example, providing an electronic address (such as an IP address) of the customer 101*n* instead of the identifying information of the customer 101*n* (such as account id, name, phone number, email address, etc.) in the notification. In some arrangements, the notification circuit 242 creates an alias for the customer 101*n* who needs funding and includes the alias in the notification. A mapping data structure linking the alias to the identifying information of the customer 101*n* may be maintained on or by the provider computing system 140. In some arrangements, the notification includes risk information associated with the customer 101*n* needing funding, such as a credit score, account balance, payment history, etc. In some arrangements, the risk information is determined based on an evaluation of the financial position of the customer 101*n* by the funds AI circuit 246.

At 310, the notification circuit 242 receives an indication of agreement to provide assistance from a second user device 102*b* of the second customer 101*b*. The second customer 101*b* may provide the indication of agreement through a user interface of the user device 102 by clicking on a link, a button, sending an SMS/text message to a specified address, etc. In some arrangements, the digital funding circuit 244 stores information on parameters predefined by the second customer 101*b* for automatic approval of funding requests, such as requests from a specific customer 101*a* (when identity of the customer 101*a* is not masked or anonymized), threshold for a credit score of the customer 101*a*, and/or the threshold amount, payee, etc. of the proposed transaction 272. The information on predefined parameters may be used by the digital funding circuit 244 to skip the approval process such that an indication of agreement to provide assistance from a second user device 102*b* of the second customer 101*b* is not needed when the proposed transaction 272 meets the pre-defined parameters.

At 312, the digital funding circuit 244 generates a funding transaction 274. According to various arrangements, the funding transaction 274 may comprise transaction terms (such transaction description, transaction date, transaction amount, payee) and a transaction amount. In some arrangements, the transaction terms include all or some of the information entered by the customer 101*a* at 304. In some arrangements, the funding transaction 274 is a donation, gift, discount, reward, and the like. In some arrangements, the funding transaction 274 is a loan and the terms further include repayment terms of the loan, such as a repayment period, repayment frequency, interest rate, installment payment amount, prepayment penalty and/or discount information, etc. The funding transaction 274 also includes the sender (for example, customer 101*b*) and the recipient (for example, customer 101*a*) of assistance. The funding transaction 274 is saved in the customer account vault 274 such that a new record or entry is created. In some arrangements where the provider institution 130 manages the sender's funds account, the funding transaction 274 is associated with the customer funds account 264 of the sender. In other arrangements, the sender may hold funds at a financial institution different from the provider institution 130. In such arrangements, the customer account vault 254 on the provider computing system 140 includes a reference to the sender's account (such as account number) and login credentials (such as a PIN number, a password, biometric information, etc.). In some arrangements, the login credentials and/or the sender's account number are tokenized to enhance data security.

At 314, the notification circuit 242 provides a message that includes a funding notification to the user device 102*a* of the customer 101*a* (recipient of funds). An example notification may be delivered to the customer 101*a* through a user interface of the user device 102*a* as described, for example, in reference to FIG. 6A. In some arrangements, the funding details, such as the amount and the terms of the funding transaction 274, are rendered to the customer 101*a* through the user interface of the user device 102*a* as shown, for example, in FIG. 6B.

At 316, the notification circuit 242 provides a message that includes a funding notification to the user device 102*b* of the customer 101*b* (sender of funds). An example notification may be delivered to the customer 101*ba* through a user interface of the user device 102*b* as shown in FIG. 6A. In some arrangements, the recipient of the funding notification may be provided with a user interface for editing the terms of the funding transaction 274 before the funding transaction 274 is finalized prior to authorization.

At 318, the digital funding circuit 244 obtains supplier information for the proposed transaction 272 and/or funding transaction 274. Some arrangements include identifying, by the digital funding circuit 244, a plurality of purchase options for the funding transaction 274. The proposed transaction 272 and/or funding transaction 274 is ranked by at least one customer 101*n* in the digital funding group 110 (as shown, for example, in FIG. 4B) such that the ranking determines the transaction amount of the assistance transaction. For example, the customer needing assistance (customer 101*a*) may have found airline tickets to a particular destination at a price of $575 and may request assistance to fund this purchase in full or in part. The funds AI circuit 246 may comprise a bot that crawls the internet and/or queries data sources connected to the provider computing system 140 through, for example, an API, to find an alternative supplier who offers a lower price of $550. The notification circuit 242 may be configured to present to the members of the digital funding group 110 through an interface (such as a digital form), allowing the users to rank the various options. In some arrangements, the digital funding circuit 244 is configured to rank the various options on factors other than price, such as, for example, preferred supplier status, availability of rewards and/or discounts for complementary products and/or services through parties affiliated with the supplier, etc. The digital funding circuit 244 is configured to convert the information associated with the highest-ranked option to the terms of the funding transaction 274.

At 320, the funds AI circuit 246 links a supplier/sponsor to the funding transaction 274 and adds the supplier/sponsor as a member of the digital funding group 110. As defined herein, a "supplier" (also known as "sponsor", "prospective sponsor", "vendor", "website-based seller", etc.) is a business entity that provides a product or service of interest to a customer of the digital funding group 110 and who may be interested in providing financial aid to fund the proposed transaction 272 and/or funding transaction 274 in whole or in part. In some arrangements, the supplier/sponsor is the vendor associated with the highest-ranking option identified at 318. In some arrangements, the ranking step is bypassed. In some arrangements, the funds AI circuit 246 comprises a bot that crawls the internet and/or queries data sources connected to the provider computing system 140 through, for example, an API, to identify the supplier/sponsor. For example, in some arrangements, the funds AI circuit 246 obtains the location of the customer 101a (recipient of funds) through the geolocation sensor 214 of the mobile device 101a. Based on the geolocation information, the funds AI circuit 246 may be configured to identify local merchants or other service providers to sponsor the customer 101a. For example, a gas station may be willing to sponsor the gas customer 101a needs to take a road trip. As another example, a local business may be willing to sponsor uniforms for a local sports team for which customer 101a needs funding. The digital funding circuit 244 may be structured to notify the local business of the sponsorship opportunity as shown, for example, in FIGS. 5A-5B and/or as described with respect to step 308.

At 322, the digital funding circuit 244 generates a second funding transaction 274. In some arrangements, the funds AI circuit 246 calculates the proposed funding amount for the sponsor/supplier based on the financial position of the customer 101a (budget, account balance, etc.) and/or based on a calculation of whether a shortfall remains after an existing member of the digital funding group 110 has already agreed to provide assistance to cover a portion of the amount of the proposed transaction 274. Thus, the proposed transaction 272 may be associated with multiple funding transactions 274 by different parties, each having agreed to cover the amount of the proposed transaction 272 in part. According to various arrangements, the second funding transaction 274 may comprise transaction terms (such transaction description, transaction date, transaction amount, payee) and a transaction amount. In some arrangements, the provider computing system 140 obtains approval for the second funding transaction 274 through a process similar to that described at 306-310.

At 324, the digital funding circuit 244 initiates an electronic funds transfer from a funds account of the customer 101b (the sender) to a funds account of the customer 101a (the recipient). The funds may be transferred using a suitable payment network and/or protocol, such as automated clearing house (ACH), PayPal™, Google Pay™, BitPay™, Wirex™, etc. In some arrangements, the funds account of the customer 101a and/or customer 101b is the customer funds account 264. In some arrangements, where the funds account of the customer 101b (the sender) is the customer funds account 264, the funding transaction 274 comprises a flag that is set to "completed" once the transaction occurs.

FIG. 4A-6B are interface display diagrams illustrating interactive user interfaces. The user interfaces described herein are provided to each or some of the plurality of customers 101n of the digital funding group 110 through each of their respective user devices 102n. In some arrangements, the user interface is a graphical user interface (GUI) visually presented to the user(s) 101n through the user device(s) 102n. In other arrangements, the user interface may comprise aural, auditory, tactile, kinesthetic and/or haptic system(s) and/or component(s) for notifying and interacting with the user(s) 101n. The user interfaces comprise various controls for providing information and receiving input from the customer 101n. For example, the individual computing device(s) 102n may buzz, vibrate, trigger an LED light indicator, and/or otherwise alert the user(s) 101n to the alert(s) and/or notification(s) received by the user device 102n.

FIG. 4A-4B are interface display diagrams illustrating interactive user interfaces for managing a new funding request according to some arrangements.

Referring to FIG. 4A, the user interface 400a is configured to present a new funding request notification to each or some of the plurality of customers 101n of the digital funding group 110. The interface 400a comprises various controls for providing information and receiving input from the customer 101n. For example, a text field on the user interface 400a may be configured to render a notification generated at 308. In the example the notification may let a customer 101b know that customer 101a needs help funding airfare and that a first website-based seller quoted a price of $575. The customer 101b may use interactive controls 402a and 402b to accept or decline the notification.

Referring to FIG. 4B, if the customer 101b accepts the notification using the interactive control 402a, then the customer 101b is provided with a user interface 400b, which is configured to allow the customer 101b to customize funding details. The input text fields 412 and 414 solicit information and amounts for the type of assistance that customer 101b would like to render. In the example arrangement, the options are a gift (at 412) and a loan (414). For example, the customer 101b may choose to fund all or some of the proposed transaction 272 as a gift, a loan, or a combination thereof. In the event different types of assistance are used, the digital funding circuit is configured to create a separate funding transaction 274 for each type of assistance.

In some arrangements, the financial assistance transaction is anonymous. For example, the identity of the recipient (here, customer 101a) may be obscured from the provider of financial assistance (here, customer 101b). Additionally or alternatively, the identity of the provider of financial assistance may be obscured from the recipient. This may be accomplished, according to various embodiments, by creating aliases for the customer 101a and 101b. A mapping data structure linking the alias to the identifying information of the customer 101n may be maintained on or by the provider computing system 140. In some arrangements, the alias assigned to customer 101a is associated with anonymized risk assessment information about customer 101a that is provided to the customer 101b, such as a credit score, account balance, payment history, etc. In this fashion, the customer 101b is presented with relevant risk assessment information so that customer 101b may decide whether to provide financial assistance to customer 101a without knowing the identity of customer 101a.

In some embodiments, both parties to the transaction are anonymous to each other such that the identity of customer 101a is hidden from customer 101b and vice versa. Where the financial assistance transaction is a loan, the operator of the provider computing system 140 is an intermediary such that two digital contracts are formed as part of the financial assistance transaction. The first contract is between the recipient (customer 101a) and the operator of the provider computing system 140. The second contract is between the sender of funds (customer 101b) and the operator of the provider computing system 140. In this fashion, two-way anonymity is maintained.

In some arrangements, the user interface 400b allows the customer 101b to rank suppliers as described in reference to step 318 of FIG. 3. For example, an aggregated list of suppliers may be generated by the funds AI circuit 246 and presented to customer 102b through the user interface 400b. The aggregated list of suppliers may include the first website-based seller proposed by the customer 101a (the party needing funding), a second website-based seller proposed by the customer 101b (a party providing funding), a third website-based seller proposed by the customer 101c (another party providing funding), a fourth website-based seller identified by the bot of the funds AI circuit 246 as described at step 320 of FIG. 3 and associated with a prospective sponsor, or any combination thereof. Customer 101b may use the interactive controls of the user interface to rank the options on the aggregated list and/or to adjust the ranking proposed by the funds AI circuit 246.

Advantageously, customer 101b does not need to browse the internet (and thus click on multiple links, input the details of the proposed transaction 272 into search boxes, browse different websites, etc.) to search for options because the provider computing system 140 may present already vetted options through the aggregated list, which is a limited set of relevant options presented to customer 101b through a streamlined interface, by automatically browsing the internet or a pre-defined list of preferred vendors for the digital funding group 110. Thus, advantageously, the arrangement of the rank suppliers control 416 saves customer 101b time and effort. For example, the provider computing system 140 may display only the options relevant to the customer by using geolocation information collected from the sender of funds, the recipient of funds, or both parties. Additionally, and advantageously, by using a pre-defined list of preferred vendors for the digital funding group 110, the organizer/owner of the digital funding group 110 and its affiliates benefit from cross-selling opportunities by presenting the relevant options to their customers. For example, the provider computing system 140 and the digital funding group 110 may be owned and/or operated by a financial institution, such as a bank, which may benefit by collecting a fee from the customer 101b for administering the loan for the funding transaction 274. The bank's affiliate, a website-based seller, such as a travel agency, may benefit by selling an airline ticket covered or partially covered by the funding transaction 274.

Figure 5B:
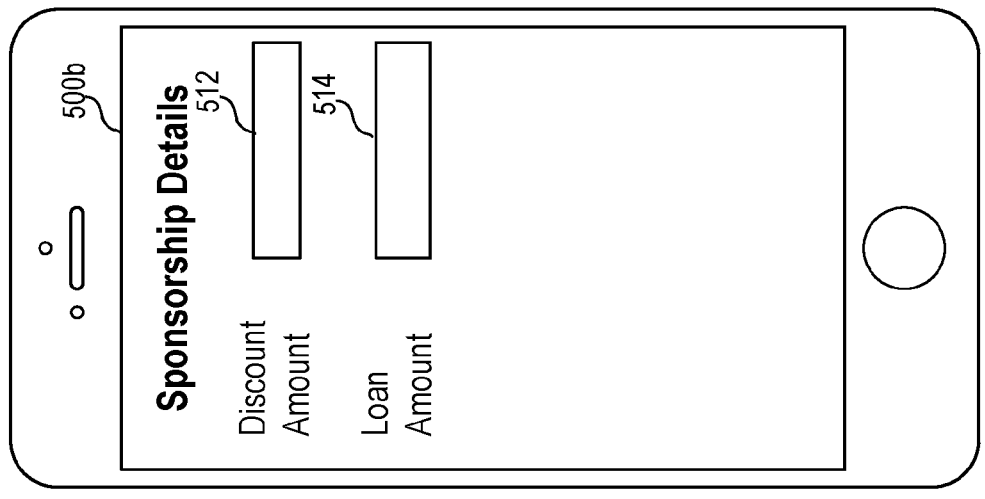
FIG. 5A-5B are interface display diagrams illustrating interactive user interfaces for managing sponsorship opportunities according to some arrangements.
Figure 5A:
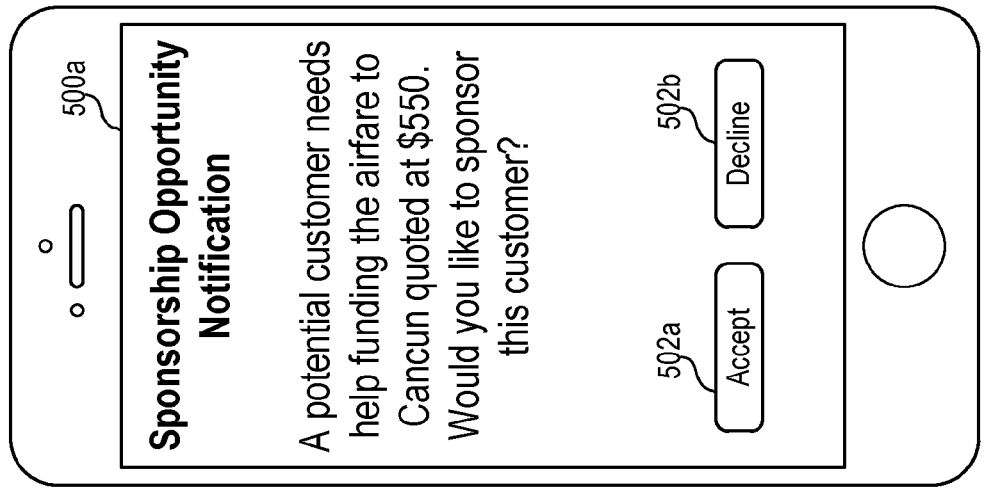

FIG. 5A-5B are interface display diagrams illustrating interactive user interfaces for managing sponsorship opportunities according to some arrangements.

Referring to FIG. 5A, the user interface 500a is configured to present a new sponsorship opportunity notification to each or some of the plurality of potential sponsors of the digital funding group 110. The set of potential sponsors may be identified as described in reference to steps 318-320 of FIG. 3. In some arrangements, the sponsor receiving the new sponsorship opportunity notification is the highest-ranked sponsor determined using the input of the customer 101b obtained as discussed with reference to FIG. 4B. The interface 500a comprises various controls for providing information and receiving input from the sponsor. For example, a text field on the user interface 500a may be configured to render a notification of a sponsorship opportunity generated at 318-320. In the example the notification may let a prospective sponsor know that customer 101a needs help funding airfare at the price quoted by the prospective sponsor (in the example shown, $550). The sponsor may use interactive controls 502a and 502b to accept or decline the notification.

Referring to FIG. 5B, if the prospective sponsor accepts the opportunity using the interactive control 502a, then the prospective sponsor is linked by the provider computing system 140 to the digital funding group 110 and thereby becomes a member of the digital funding group 110. The sponsor is provided with a user interface 500b, which is configured to allow the sponsor to customize funding details. The input text fields 512 and 514 solicit information and amounts for the type of assistance that the sponsor would like to render. In the example arrangement, the options are a discount (at 512) and a loan (514). For example, the sponsor may choose to fund all or some of the proposed transaction 272 by giving the customer 101a a discount, offering the customer 101a a loan, or a combination thereof. In the event different types of assistance are used, the digital funding circuit is configured to create a separate funding transaction 274 for each type of assistance.

Figure 6B:
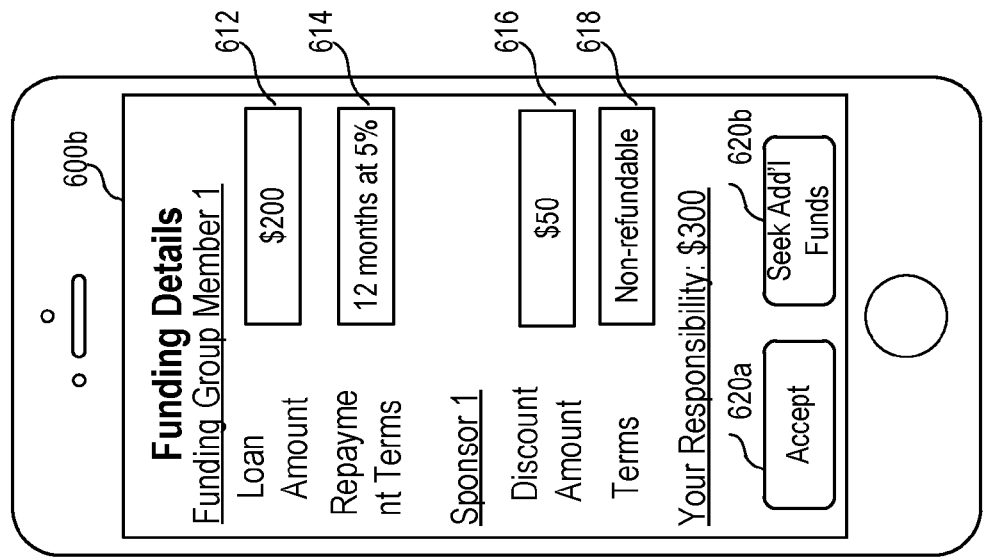
FIG. 6A-6B are interface display diagrams illustrating interactive user interfaces for managing funding approval according to some arrangements.
Figure 6A:
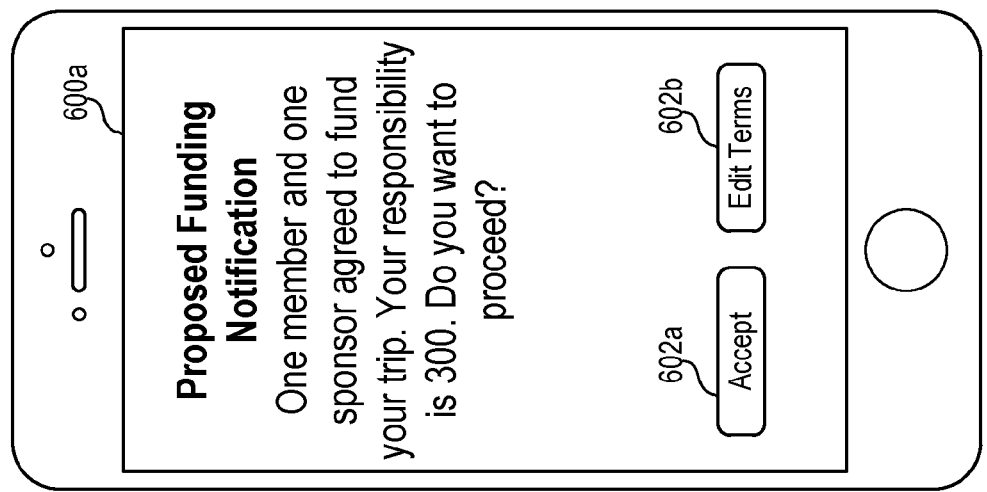

FIG. 6A-6B are interface display diagrams illustrating interactive user interfaces for managing funding approval according to some arrangements.

Referring to FIG. 6A, the user interface 600a is configured to present a new proposed funding notification to the customer 101a of the digital funding group 110. In the example shown, customer 101a is the party receiving assistance. The interface 600a comprises various controls for providing information and receiving input from the customer 101a. For example, a text field on the user interface 600a may be configured to render a funding notification as described, for example in reference to step 314 of FIG. 3. In the example the notification may let customer 101a know that two parties have agreed to provide assistance and that the residual responsibility of the customer 101a is the difference between the total amount of assistance provided and the amount of the proposed transaction 272. In some arrangements, the proposed transaction 272 may have been modified as a result of finding an alternative supplier by a customer 101b and/or by the funds AI circuit 246 (as described, for example, in reference to FIG. 4B). For example, the payee, amount, etc. of the proposed transaction 272 may be modified. The customer 101a may use interactive controls 602a and 602b to accept or edit the terms of the notification.

Referring now to FIG. 6B, the customer 101a is presented with a user interface 600b for accepting or editing the proposed funding transaction(s) 274. If the customer 101a chooses to accept the terms of the proposed funding transaction(s) 274, the fields of the user interface 600b may be presented to the user as non-editable. If the customer 101a chooses to review and/or change the terms of the proposed funding transaction(s) 274, the fields of the user interface 600b may be presented to the user as editable. Advantageously, loan papers and traditional GUIs for loan creations in the context of funding groups are very difficult to navigate, with various types of information spread out such that a lot of scrolling back and forth is needed. An example interface of the arrangement of FIG. 6B has all the relevant information needed by the customer to accept 620a or seek additional funds 620b. Thus everything is carefully planned and consolidated into a given interface, which further includes user interactive elements that allow the user to accept the assistance.

In the example shown, customer 101b has agreed to provide a loan in the amount of $200 (shown in the interactive control 612) with the terms including a repayment period of 12 months at 5% interest (shown in the interactive control 614). The data shown in the interactive controls 612 and 614 is populated by the notification circuit 242 by querying the proposed transaction vault 252 to obtain a first proposed transaction 272 of the proposed transaction set 262. The customer 101a may edit the values, at which point the notification circuit 242 may issue an updated funding notification to the sender of funds (here, customer 101b or the sponsor) through the user device 102b. The customer 101b or the sponsor may accept, reject, or propose a counteroffer to the customer 101a, at which point the customer 101a may be presented with a refreshed or updated proposed funding notification through the user interface 600a of FIG. 6A.

In the example shown, Sponsor A has agreed to provide a discount in the amount of $50 (shown in the interactive control 616) with a stipulation that the airfare purchase is non-refundable (shown in the interactive control 618). The data shown in the interactive controls 616 and 618 is populated by the notification circuit 242 by querying the proposed transaction vault 252 to obtain a second proposed transaction 272 of the proposed transaction set 262. The customer 101a may edit the values, at which point the notification circuit 242 may issue an updated funding notification to the sender of funds (here, sponsor 1) through the user device 102c associated with sponsor 1. The Sponsor A may accept, reject, or propose a counteroffer to the customer 101a, at which point the customer 101a may be presented with a refreshed or updated proposed funding notification through the user interface 600a of FIG. 6A. In some arrangements, the provider computing system 140 may store parameters for non-negotiable terms and/or amounts associated with various sponsors such that customer 101 may only accept or reject the second proposed transaction 272 in its entirety. For example, the parameters may include non-negotiable amounts under a specified dollar threshold or for a specific transaction description, transaction date, transaction amount, payee (here, sponsor), etc. In some arrangements, the specific transaction description is free text and the funds AI circuit is configured to mine this information to determine if it matches a pre-defined parameter for when the proposed transaction 272 and/or funding transaction 274 is non-negotiable. For example, the pre-defined parameter may be a wildcard, such as "air*" and the funds AI circuit may be configured to use machine learning algorithms to find transaction descriptions that match this parameter for non-negotiability (such as "airfare", "ticket", etc.). One skilled in the art will appreciate that machine learning algorithms may be any algorithms suitable for implementation to determine synonyms, such as discovery of synonyms using historical user data, lexical synonyms, natural language processing algorithms, classification algorithms, etc.

The customer 101a may accept the funding using the interactive control 620a. In some arrangements, the customer 101a may seek more funding using the interactive control 620b to cover any remaining amount not covered by the obtained funding (in this case, $300). In this case, a new proposed funding transaction 272 may be generated and the processes described at 304-316 of FIG. 3 repeated to broadcast the request to the members of the digital funding group 302. In some arrangements, the request for a new proposed funding transaction 272 is not broadcast to the individuals and/or entities who already provided funding (such as customer 102b and Sponsor A in the example above.)

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
establishing, by a remote provider computing system, a digital funding group for transactions initiated by a user via a user computing device;
generating, by the remote provider computing system, an alias that obscures identity information of the user;
receiving, via a digital funding group client application associated with the user computing device and communicatively coupled to the remote provider computing system via a network, information relating to a prospective transaction;
monitoring, by the digital funding group client application, a system idle timer of the user computing device and resetting, by the digital funding group client application, the system idle timer at predetermined time intervals, thereby maintaining, by the digital funding group client application, the user computing device in active mode;
while maintaining, by the digital funding group client application, the user computing device in active mode,
performing, by the digital funding group client application via the network, an electronic search for a sponsorship opportunity related to the at least one prospective transaction;
receiving, by the digital funding group client application via the network, a search result dataset;
generating, by the digital funding group client application, a displayable result set based on the search result dataset, the displayable result set comprising at least one prospective sponsor; and
rendering, by the digital funding group client application, the displayable result set on a display of the user computing device, wherein the at least one prospective sponsor is selectable by the user; and
responsive to a user selection of a particular sponsor from the displayable result set, transmitting, by the digital funding group client application to the remote provider computing system, an electronic instruction to add the particular sponsor to the digital funding group; and transmitting, by the remote provider computing system to a sponsor computing system, a sponsorship opportunity notification comprising the alias.

2. The method of claim 1, wherein the sponsorship opportunity comprises a discounted resource.

3. The method of claim 1, wherein the sponsorship opportunity comprises at least one of a loan and a grant.

4. The method of claim 1, further comprising, responsive to the user selection of the particular sponsor, facilitating a financial transaction between the user and the particular sponsor.

5. The method of claim 1, wherein the at least one prospective sponsor is determined using artificial intelligence.

6. The method of claim 1, wherein the at least one prospective sponsor is ranked relative to other prospective sponsors.

7. The method of claim 1, further comprising allowing, by the digital funding group client application, real-time user interaction with the user device while maintaining the user device in active mode.

8. A system comprising a provider computing system, a digital funding group client application associated with a user computing device and communicatively coupled to the provider computing system via a network, the provider computing system being communicatively coupled to a sponsor computing system, the user computing device comprising at least one processor, and at least one memory device storing computer-executable instructions thereon that, when executed by the at least one processor, cause the at least one processor to perform operations comprising:

establish, by the provider computing system, a digital funding group for transactions initiated by a user via the user computing device;

generate, by the provider computing system, an alias that obscures identity information of the user;

receive, by the provider computing system via the digital funding group client application, information relating to a prospective transaction;

monitor, by the digital funding group client application, a system idle timer of the user computing device and reset, by the digital funding group funding application, the system idle timer at predetermined time intervals, and thereby maintain the user computing device in active mode;

while performing operations, by the digital funding group client application, to maintain the user computing device in active mode, perform, by the digital funding group client application via the network, an electronic search for a sponsorship opportunity related to the at least one prospective transaction;

receive, by the digital funding group client application via the network, a search result dataset;

generate, by the digital funding group client application, a displayable result set based on the search result dataset, the displayable result comprising at least one prospective sponsor; and render, by the digital funding group client application, the displayable result set on a display of the user computing device, wherein the at least one prospective sponsor is selectable by the user; and responsive to a user selection of a particular sponsor from the displayable result set, transmit, by the digital funding group client application to the provider computing system, an electronic instruction to add the particular sponsor to the digital funding group; and transmit, by the provider computing system to the sponsor computing system, a sponsorship opportunity notification comprising the alias.

9. The system of claim 8, wherein the sponsorship opportunity comprises a discounted resource.

10. The system of claim 8, wherein the sponsorship opportunity comprises at least one of a loan and a grant.

11. The system of claim 8, further comprising operations to, responsive to the user selection of the particular sponsor, facilitate a financial transaction between the user and the particular sponsor.

12. The method of claim 8, wherein the at least one prospective sponsor is determined using artificial intelligence.

13. The method of claim 8, wherein the at least one prospective sponsor is ranked relative to other prospective sponsors.

14. The method of claim 8, further comprising operations to allow, by the digital funding group client application, real-time user interaction with the user device while maintaining the user device in active mode.

15. Non-transitory computer-readable media comprising computer-executable instructions stored thereon that, when executed by at least one processor, cause the at least one processor to perform operations comprising:

establish, by a provider computing system communicatively coupled via a network to a digital funding group client application provided to a user computing device and to a sponsor computing system, a digital funding group for transactions initiated by a user via the user computing device;

generate, by the provider computing system, an alias that obscures identity information of the user;

receive, by the provider computing system from the digital funding group client application via the network, information relating to a prospective transaction;

monitor, by the digital funding group client application, a system idle timer of the user computing device and reset, by the digital funding group client application, the system idle timer at predetermined time intervals, and thereby maintain the user computing device in active mode;

while performing operations to maintain the user computing device in active mode, perform, by the digital funding group client application via the network, an electronic search for a sponsorship opportunity related to the at least one prospective transaction;

receive, by the digital funding group client application via the network, a search result dataset;

generate, by the digital funding group client application, a displayable result set based on the search result dataset, the displayable result set comprising at least one prospective sponsor; and render, by the digital funding group client application, the displayable result set on a display of the user computing device, wherein the at least one prospective sponsor is selectable by the user; and responsive to a user selection of a particular sponsor from the displayable result set, transmit, by the digital funding group client application to the provider computing system, an electronic instruction to add the particular sponsor to the digital funding group; and transmit, by the provider computing system to a sponsor computing system, a sponsorship opportunity notification comprising the alias.

16. The media of claim 15, wherein the sponsorship opportunity comprises a discounted resource.

17. The media of claim 15, wherein the sponsorship opportunity comprises at least one of a loan and a grant.

18. The media of claim 15, further comprising operations to, responsive to the user selection of the particular sponsor, facilitate a financial transaction between the user and the particular sponsor.

19. The media of claim 15, wherein the at least one prospective sponsor is determined using artificial intelligence.

20. The media of claim 15, wherein the at least one prospective sponsor is ranked relative to other prospective sponsors.

\* \* \* \* \*